United States Patent [19]

Laster et al.

[11] Patent Number: 5,191,526
[45] Date of Patent: Mar. 2, 1993

[54] METHOD FOR REMOVING COHERENT NOISE FROM SEISMIC DATA

[75] Inventors: Stanley J. Laster, Dallas; Robert A. Meek, Sanger; Thomas E. Shirley, Richardson, all of Tex.

[73] Assignee: Mobil Oil Corporation, Fairfax, Va.

[21] Appl. No.: 491,885

[22] Filed: Mar. 12, 1990

Related U.S. Application Data

[63] Continuation-in-part of Ser. No. 220,186, Jul. 18, 1988, abandoned.

[51] Int. Cl.$^5$ ............................................. G01V 1/00
[52] U.S. Cl. .................................... 364/421; 367/45; 367/49
[58] Field of Search .................. 364/421, 422; 367/43, 367/47, 45, 21, 24, 38, 46, 49

[56] References Cited

U.S. PATENT DOCUMENTS

| | | | |
|---|---|---|---|
| 4,380,059 | 4/1983 | Ruehle | 367/46 |
| 4,437,176 | 3/1984 | Mack | 367/38 |
| 4,594,693 | 6/1985 | Pann et al. | 367/43 |
| 4,665,510 | 5/1987 | Foster et al. | 367/21 |
| 4,809,235 | 2/1989 | Dragoset, Jr. | 367/21 |
| 4,829,487 | 5/1989 | Malloy | 367/40 |
| 5,060,202 | 10/1991 | Meek et al. | 367/45 |

Primary Examiner—Roy N. Envall, Jr.
Assistant Examiner—Khai Tran
Attorney, Agent, or Firm—Alexander J. McKillop; Charles J. Speciale; George W. Hager, Jr.

[57] ABSTRACT

Method for removing coherent noise from a series of seismic traces. Each seismic trace included in the series is Fast Fourier Transformed into the frequency domain. For each frequency of the resultant f-x representation, a series of N complex numbers, one corresponding to each trace, is selected. The selected series of complex numbers corresponding to each frequency are processed to produce autoregressive model coefficients from which a polynomial rooting provides complex roots related to wavenumbers and decay constants. Amplitudes and phases for complex non-stationary spatial sinusoids associated with the estimated wavenumbers are then determined. For all frequencies f, the collection of determined wavenumbers, decay constants, amplitudes and phases constitute an f-k representation of the seismic traces. The produced f-k representation is examined to identify components corresponding to seismic data and the f-k components which correspond to seismic data are summed to reconstruct frequency components of an f-x representation of the acquired seismic traces with coherent noise removed.

37 Claims, 5 Drawing Sheets

METHOD FOR REMOVING COHERENT NOISE FROM SEISMIC DATA

RELATED APPLICATION

This application is a continuation-in-part of U.S. patent application Ser. No. 220,186 filed Jul 18, 1988, now abandoned and hereby incorporated by reference as if reproduced in its entirety.

BACKGROUND OF THE INVENTION

This invention relates to a method for removing coherent noise from seismic data. More specifically, this invention relates to an improved method for removing coherent noise from a series of seismic traces which correspond to a small group of geophones by exploiting the structure of an FFT/ME/EP (Fast Fourier Transform/Maximum Entropy/Extended Prony) model of the seismic data.

In seismic exploration, it is common practice to deploy a large array of geophones on the surface of the earth and to record the vibrations of the earth at each geophone location to obtain a collection of seismic traces. The traces are sampled and recorded for further processing. When the vibrations so recorded are caused by a seismic source activated at a known time and location, the recorded data can be processed by computer in known ways to produce an image of the subsurface. The image thus produced is commonly interpreted by geophysicists to detect the possible presence of valuable hydrocarbons.

Seismograms are commonly recorded as digital samples representing the amplitude of received seismic signal as a function of time. Since seismograms are usually obtained along a line of exploration on the surface of the earth, the digital samples can be formed into x-t arrays with each sample in the array representing the amplitude of the seismic signal as a function of horizontal distance and time. When such arrays are visually reproduced, by plotting or the like, seismic sections are produced. A seismic section depicts the subsurface layering of a section of the earth. It is the principal tool which the geophysicist studies to determine the nature of the earth's subsurface formation. Before an array of seismic samples or traces can be converted into a seismic section for interpretation by geophysicists, however, the array must be extensively processed to remove noise and to make reflection events discernable.

In the processing of seismograms, x-t arrays are sometimes transformed into arrays of complex numbers as a function of frequency and wavenumber. This is commonly referred to as a "frequency-wavenumber" or "f-k" transformation. The f-k transformation has been used as a tool to study and filter seismic data. F-k transforms are routinely used to represent data collected by large arrays of sensors, including seismic data. Usually, the f-k representations are computed by Fast Fourier Transforms (hereafter referred to as FFTs). The resulting data representations are parameterized by frequencies, wavenumbers (spatial frequencies), amplitudes and phases. In particular, for each frequency there is a collection of wavenumbers, and for each frequency-wavenumber pair there is a complex number representative of an amplitude and a phase. Among various applications of this representation are spectrum analysis (displaying of the amplitude squared as a function of frequency and wavenumber) and filtering in the frequency-wavenumber domain.

In U.S. Pat. No. 4,218,765 issued to Kinkade, seismic traces are transformed to an f-k array and filtering is performed on the traces in f-k domain. In U.S. Pat. No. 4,308,059 issued to Ruehle, multiple reflections are filtered from seismograms by transforming them into an f-k array representing amplitude as a function of frequency and wavenumber. In Ruehle, the f-k array of the seismograms is filtered by weighting all samples with the inverse of the f-k transform of the multiple reflections. In U.S. Pat. No. 4,594,693 issued to Pann et al., seismic trace interpolation is carried out by inserting zero amplitude traces between the seismic traces in a section where spatial aliasing is a problem. The traces are then transformed into an f-k array. The f-k array is filtered to reject samples in a region of frequency and wavenumber which exhibits aliasing. The filtered f-k array is then transformed back into a seismic section representing amplitude as a function of time and distance.

It is well known that seismic data can change appreciably in frequency and wavenumber from one place on the surface to another. Indeed, significant differences in the character of seismic energy has been found to occur within the distance spanned by feasible arrays of seismic geophones. It would be desirable, therefore, to process recorded seismic data as if it were sensed by a collection of subsets of geophones on the surface. For example, the first few traces describe the seismic data, and hence the subsurface, near one end of the spread of seismic geophones, while a few consecutive traces centered elsewhere within the spread of seismic geophones would describe the seismic data, and hence the subsurface, elsewhere. Significant differences between data at different locations can best be detected by separate processing of such small sets of consecutive traces. In particular, it would be desirable to analyze the data from each subset of sensors in terms of the frequency-wavenumber representations of the subsets of data. The collection of f-k representations of the data would provide a description of the spatial variation of the seismic data useful in analysis, filtering, and other applications.

While it would be desirable to process the recorded seismic data as if it were sensed by a collection of subsets of geophones on the surface, when a small number of seismic traces are used, such as when processing data from a subset of geophones, numerous undesirable side effects occur. For example, when using the FFT to obtain both frequency and wavenumber representations of the subset of seismic data, the FFT is corrupted by processing noise generally known as "sidelobes" or "Gibbs phenomenon". This processing noise results from transforming too few spatial data points and will degrade the traditional uses of f-k representations such as spectrum analysis and filtering. Traditionally, seismic exploration provides ample time samples so that corruption of the FFT by such side effects does not occur. It is only when processing seismic data where a limited number of spatial samples are available, such as attempting to process seismic data from a small subset of geophones, does such side effects prevent the f-k representation produced by FFT methods from being useful in analyzing the acquired seismic data.

SUMMARY OF THE INVENTION

It is an object of this invention to remove coherent noise from a series of seismic traces which correspond to a small group of geophones.

It is another object of this invention is to remove coherent noise from the series of seismic traces which correspond to the small group of geophones such that changes in the character of the seismic data occurring over the geophone array may be detected.

It is yet another object of this invention to process the series of seismic traces corresponding to the small group of geophones such that undesirable effects, such as spatial sidelobes or spatial Gibbs processing noise, often produced during traditional methods of processing series of seismic traces corresponding to small groups of geophones, do not occur.

It is a feature of this invention to remove coherent noise from a series of seismic traces by reconstructing the data portion of the seismic traces from an FFT/ME/EP model of the acquired seismic data.

It is another feature of this invention to remove coherent noise from a series of seismic traces by separating the signal and coherent noise portions of the FFT/ME/EP model of the acquired seismic data.

A seismic record comprising a plurality of seismic traces is divided into a series of subsets of N consecutive seismic traces. Each subset of N consecutive seismic traces corresponds to a set of geophones grouped together along the line of exploration. Each seismic trace included in a selected subset is Fast Fourier Transformed (FFT) into the frequency domain. For each frequency of the resultant f-x representation, a series of N complex numbers, one corresponding to each trace of the selected subset is selected. The selected series of complex numbers corresponding to the selected frequency are processed to estimate a set of autoregressive (AR) coefficients, thereby yielding autoregressive model coefficients from which a polynomial rooting will provide complex numbers related to the wavenumbers and decay constants of the desired f-k representation. Amplitudes and phases for complex nonstationary spatial sinusoids associated with the estimated wavenumbers are then determined.

For all frequencies f, the collection of wavenumbers $k(f,i)$, decay constants $\lambda(f,i)$, amplitudes $A(f,i)$ and phases $\alpha(f,i)$ where $i = 1, 2, \ldots, N$, thus produced constitute an f-k representation of seismic data valid for a small number of traces. The produced f-k representation is then examined to identify those components which correspond to signals and those components which correspond to coherent noise. The complex f-k components which correspond to signals are summed to reconstruct frequency components of the f-x representation of the acquired seismic data. An x-t data set of the signals is then constructed by inverse FFT, yielding seismic traces containing the signals without the coherent noise.

In an alternate embodiment of the invention, the complex f-k components which correspond to coherent noise are summed to reconstruct frequency components of the f-x representation of the coherent noise. An x-t data set of the coherent noise is constructed by inverse FFT and subtracted from the original seismic data to produce the x-t data set with the coherent noise removed from the seismic data.

The above and other objects, advantages and features of the invention will be more readily understood from the following detailed description of the invention, which is provided in connection with the accompanying drawings.

DETAILED DESCRIPTION OF THE INVENTION

Figure 1A:
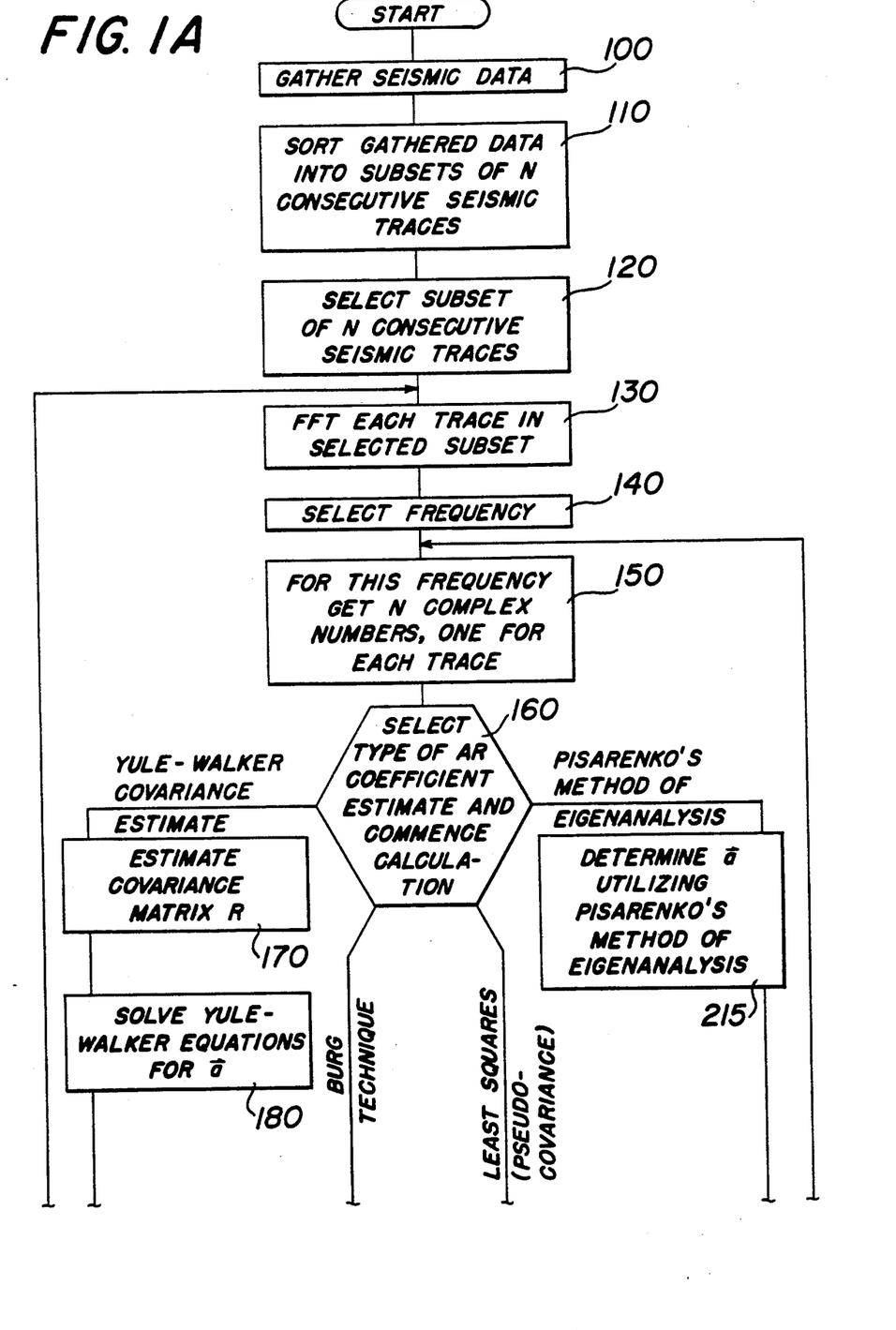
FIGS. 1A, 1B, 1C illustrate, in flow chart form, the method of removing coherent noise from seismic data acquired by a small group of geophones of the present invention.
Figure 1B:
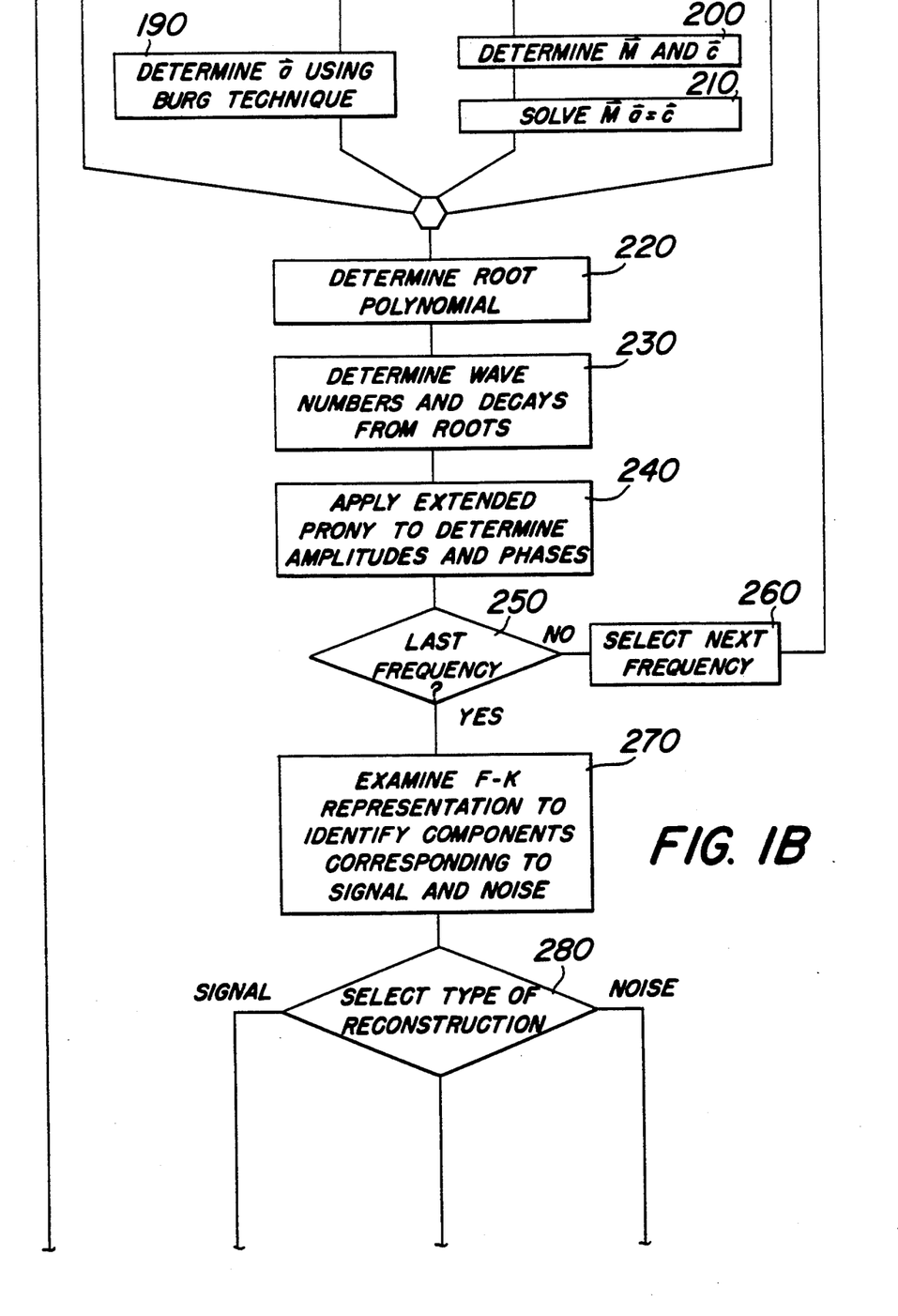
Figure 1C:
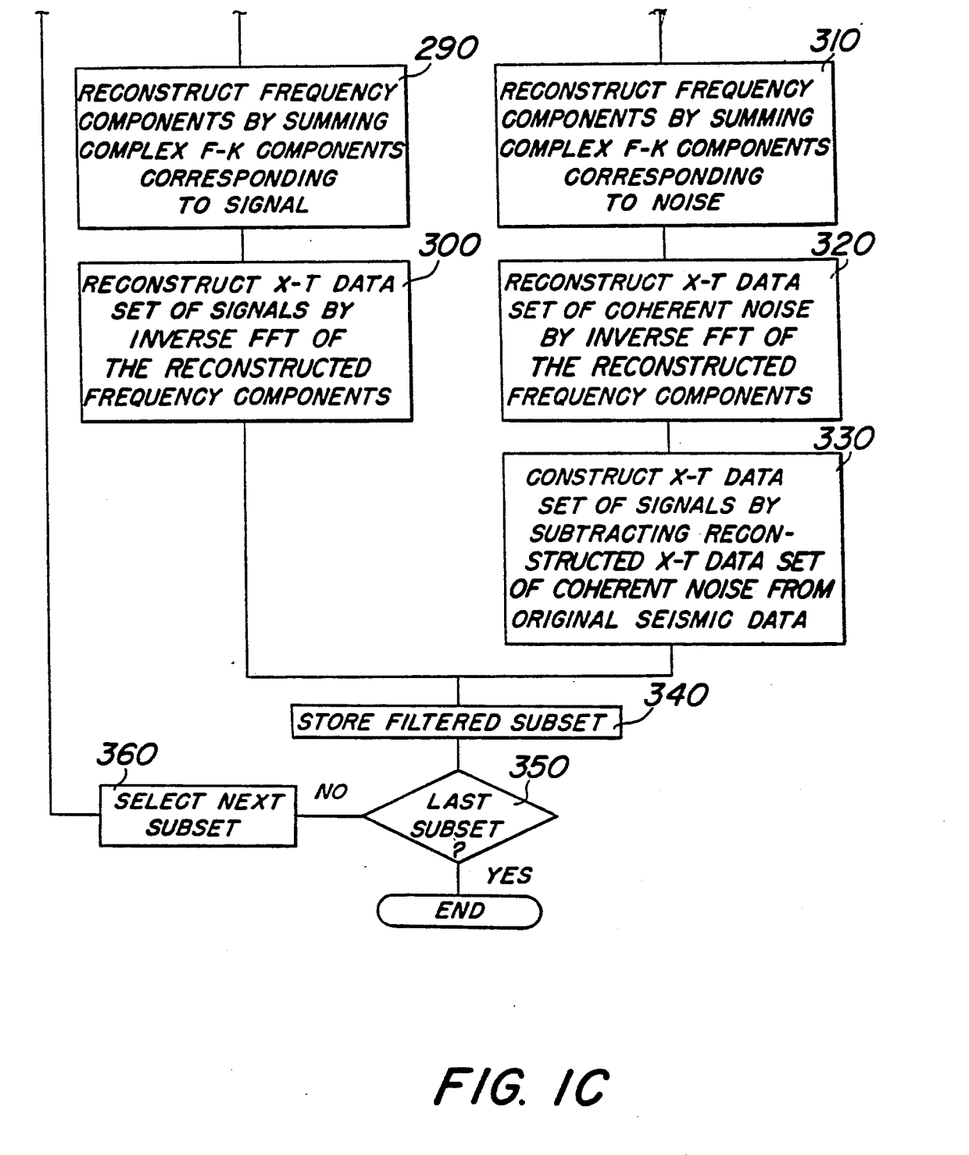
Figure 2:
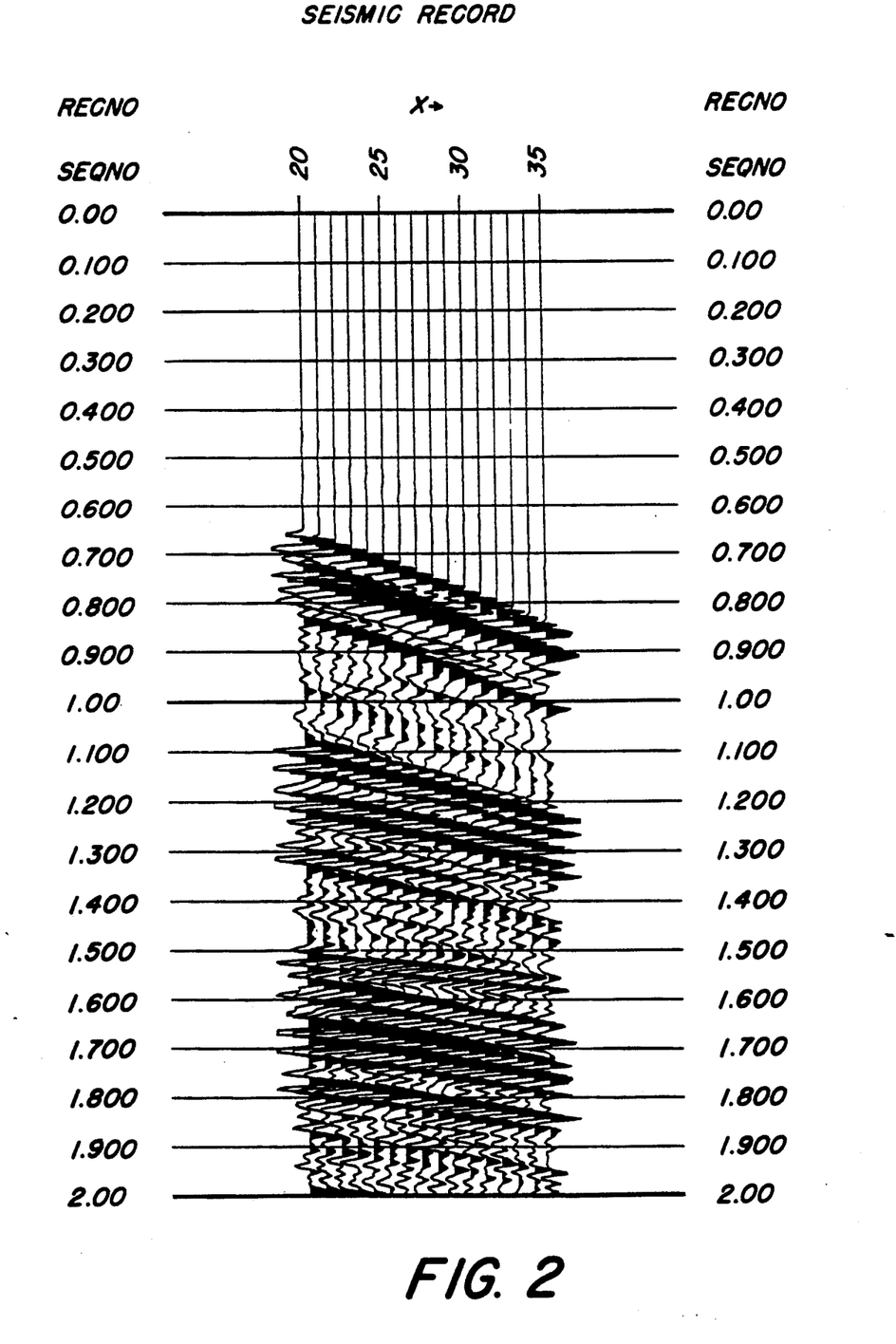
FIG. 2 illustrates an x-t domain shot record produced by conventional seismic exploration along a line of exploration.
Figure 3:
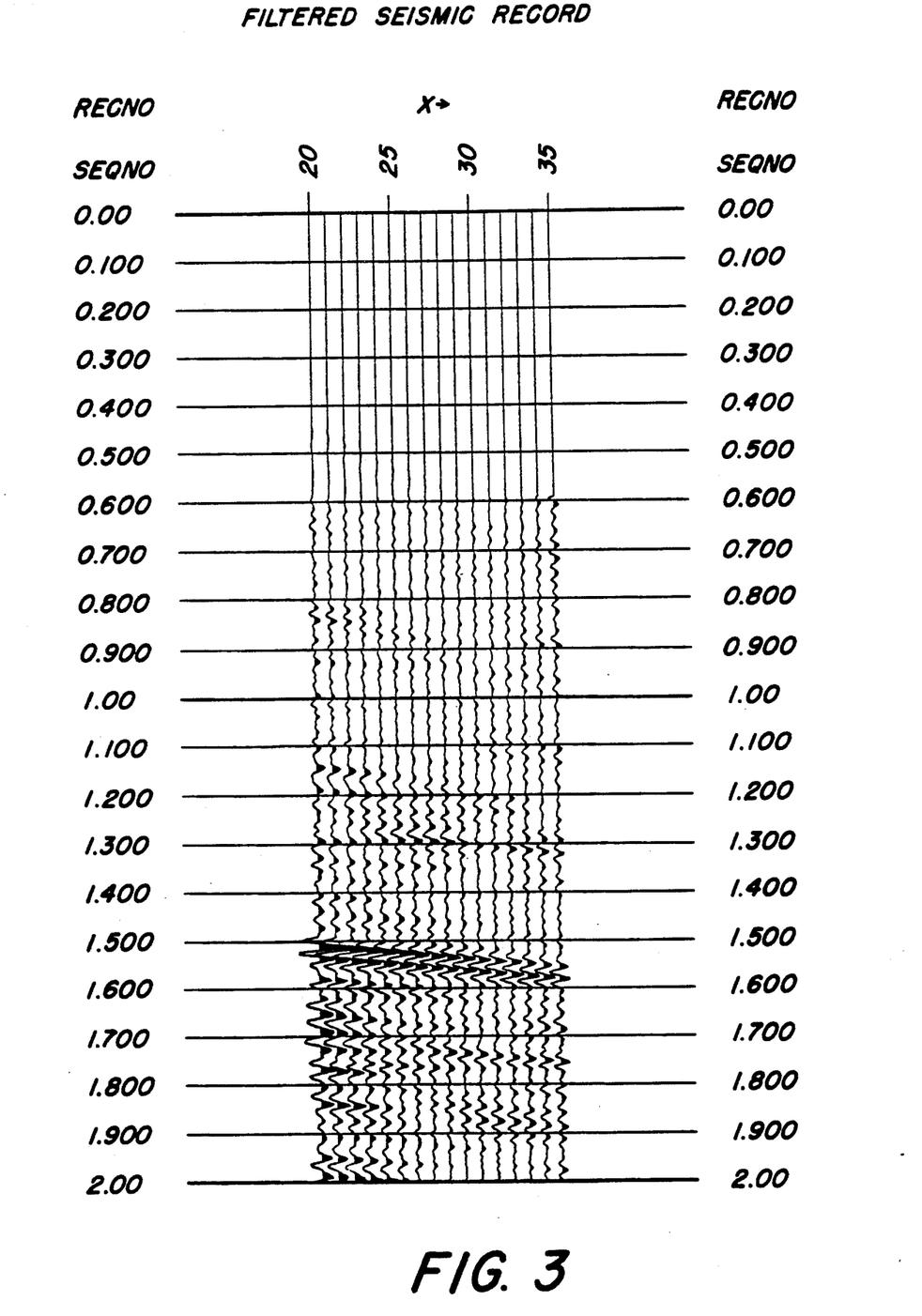
FIG. 3 illustrates the x-t domain shot record of FIG. 2 after coherent noise removal in accordance with the method of FIG. 1.

Turning first to FIGS. 1A, 1B, 1C, the method of removing coherent noise from a series of seismic traces which correspond to a small subset of geophones positioned on the surface is hereby described. The method commences at step 100 with the acquisition of seismic data using any one of numerous well-known seismic exploration techniques. For example, an artificial disturbance may be generated along the earth by the use of dynamite or the like. The resulting acoustic waves travel downwardly in the earth and are reflected upward from subsurface reflecting interfaces. The reflected waves are received at geophones or other detectors located along the surface and recorded in reproducible form as seismograms. Seismic traces which would be acquired by a typical seismic survey may be seen by reference to FIG. 2. The seismic traces depicted in FIG. 2 represent the amplitude of seismic reflections as a function of time and distance along a line of exploration in the x direction of the earth's surface. These traces have been gathered into an x-t array commonly referred to as a "seismic section" or "seismic record".

Proceeding to step 110, the gathered seismic traces are sorted into a plurality of subsets of seismic traces. Preferably, each subset should consist of an equal number N of consecutive seismic traces of the seismic section. Each seismic trace is comprised of a finite number T of consecutive time samples separated by a distance $\Delta t$ and adjacent traces are separated by a distance $\Delta x$. Furthermore, each subset of N seismic traces correspond to a subset of N geophones positioned on the subsurface. The subsets should be selected such that the frequency and wavenumber characteristics do not change appreciably between the series of N seismic traces which comprise each subset.

Proceeding to step 120, a first subset comprised of N consecutive seismic traces is selected for further processing. Proceeding to step 130, each seismic trace included in the selected subset is then Fast Fourier Transformed (hereafter abbreviated as FFT) into the frequency domain. The subset of N consecutive seismic traces $x(n,t)$ may be represented according to Equation (1) below:

$$x(n,t) = \tag{1}$$

$$\begin{bmatrix} x(1,0) & x(2,0) & \ldots & x(N,0) \\ x(1,\Delta t) & x(2,\Delta t) & \ldots & x(N,\Delta t) \\ \cdot & \cdot & \ldots & \cdot \\ \cdot & \cdot & \ldots & \cdot \\ \cdot & \cdot & \ldots & \cdot \\ x(1,(T-1)\Delta t) & x(2,(T-1)\Delta t) & \ldots & x(N,(T-1)\Delta t) \end{bmatrix}$$

where:
n 1, 2, 3, ..., N; and
t 0, $\Delta t$, ..., $(T-1)\Delta t$,
and the Fourier transform X(f,n) of the subset of N consecutive seismic traces may be represented as follows:

$$X(f,n) = \int_{-\infty}^{\infty} x(n,t)e^{-j2\pi ft}dt \quad (2)$$

The FFT of the x-t domain seismic traces produces a set of complex numbers which are related to the phase and amplitude of harmonically related sinusoids comprising the time series.

Proceeding to step 140, a first frequency in the rang of frequencies produced by the FFTs of the selected subset of seismic traces is selected. For example, in a typical seismic exploration of the type described herein, the frequency range produced by the FFTs of the gathered seismic traces will be from 0 to 125 cycles per second. At step 150, N complex numbers, each corresponding to one of the traces of the selected subset and corresponding to the frequency selected at step 140, are selected for further processing.

From the set of complex numbers selected at step 150, a next set of complex numbers related to the wave-numbers and decay constants of the desired f-k representation of the selected subset of seismic data are determined in accordance with the methods described herein. Seismic data often consists of a few strong clear events comprising direct arrivals, surface noise, multiples and reflections. When a small number of adjacent traces are considered, these events are approximately linear. For a single frequency component, linear events are represented by spatial sinusoids. Therefore, it may be expected that a good wavenumber representation will result from computing a set of AR coefficients of the spatial data produced by the FFT. Wavenumbers, decay constants, phases and amplitudes for the selected set of complex numbers N are determined next to yield a better estimate of the f-k representation than that produced by the FFT, particularly in those cases where only a small number of data points is available and when the representation consists of a few strong spectral components.

Proceeding to step 160, the method of determining the AR coefficients for the data sequence X(f,0), ..., X(f,N−1) for the specified frequency is now selected. In alternate embodiments of the invention, a least squares autoregressive coefficient estimate, direct estimation of the data autocorrelation matrix followed by solution of the Yule-Walker equations, or the Burg technique may be selected to determine the AR coefficients, assuming the data can be modeled by an autoregressive sequence:

$$X_n = \sum_{k=1}^{P} a_k X_{n-k} + \mu_n \quad (3)$$

where:
$X_n$ is the complex sequence associated with each trace for each frequency;
$a_k$ is the set of AR coefficients estimated for this sequence; and
$\mu_n$ is a white noise sequence with variance $\sigma^2$ associated with this sequence.

Alternately, Pisarenko's method of eigenanalysis may be utilized in determining the AR coefficients. If direct estimation of the data autocorrelation matrix followed by solution of the Yule-Walker equations is selected at step 160 for determining the AR coefficients, the method of the present invention proceeds to step 170 where the autocorrelation matrix $R_{xx}$ where:

$$R_{xx} = \begin{bmatrix} R(0) & R(1) & \ldots & \ldots & R(P-1) \\ R^*(1) & R(0) & R(1) & \ldots & R(P-2) \\ \cdot & \cdot & \cdot & & \cdot \\ \cdot & \cdot & \cdot & & \cdot \\ \cdot & \cdot & \cdot & & \cdot \\ R^*(P-1) & \ldots & \ldots & \ldots & R(0) \end{bmatrix} \quad (4)$$

is estimated according to Equation (5) as set forth below. R* denotes the complex conjugate of R.

$$R(m) = \frac{1}{N-m}\left[\sum_{n=0}^{N-m-1} X_{n+m}X^*_n\right] \quad (5)$$

for $m = 0, \ldots, P, P \leq N - 1$,

After determination of the autocorrelation matrix $R_{xx}$, matrix a, where:

$$a = \begin{bmatrix} a_1 \\ a_2 \\ \cdot \\ \cdot \\ \cdot \\ a_P \end{bmatrix} \quad (6)$$

is determined by a solution of the Yule-Walker equations as set forth in Equation (7).

$$\begin{bmatrix} R(0) & R(1) & \ldots & \ldots & R(P-1) \\ R^*(1) & R(0) & R(1) & \ldots & R(P-2) \\ \cdot & \cdot & \cdot & & \cdot \\ \cdot & \cdot & \cdot & & \cdot \\ \cdot & \cdot & \cdot & & \cdot \\ R^*(P-1) & \ldots & \ldots & \ldots & R(0) \end{bmatrix} \begin{bmatrix} a_1 \\ a_2 \\ \cdot \\ \cdot \\ \cdot \\ a_P \end{bmatrix} = \begin{bmatrix} R(1) \\ R(2) \\ \cdot \\ \cdot \\ \cdot \\ R(P) \end{bmatrix} \quad (7)$$

Returning to step 160, if it is determined that the Burg technique be utilized in determining an estimate of the AR coefficients, the method of the present invention proceeds to step 190 where matrix a, as set forth in equation (6) above, is determined by application of the Burg technique.

According to the Burg technique, the forward linear prediction error may be defined:

$$e_{pn} = \sum_{k=0}^{P} a_{pk} x_{n-k} \tag{8}$$

Further to the Burg technique, the backward linear prediction error may be defined:

$$b_{pn} = \sum_{k=0}^{P} a^*_{pk} x_{n-p+k} \tag{9}$$

for $p \leq n \leq N-1$, where $a_{p0}=1$.

The sum of the forward and backward prediction error energies as set forth in Equation (10):

$$\xi_p = \sum_{n=p}^{N-1} |e_{pn}|^2 + \sum_{n=p}^{N-1} |b_{pn}|^2 \tag{10}$$

may be minimized for $p \leq n \leq N-1$, subject to the constraint that the predictor parameters satisfy the Levinson recursion as set forth in equation (11):

$$a_{pk} = a_{p-1,k} + a_{pp} a^*_{p-1,p-k} \tag{11}$$

for all orders $p=1$ to $P$, thus yielding the relationship:

$$a_{ii} = \frac{-2 \sum_{k=i}^{N-1} b^*_{i-1,k-1} e_{i-1,k}}{\sum_{k=i}^{N-1} (|b_{i-1,k-1}|^2 + |e_{i-1,k}|^2)} \tag{12}$$

Returning to step 160, if it is determined that a least squares autoregressive coefficient estimate be utilized in determining an estimate of the AR coefficients, the method of the present invention proceeds to step 200 where matrixes M and c are determined in accordance with the following:

$$M_{ij} = \sum_{m=P}^{N-1} x^*_{m-i} x_{m-j} \text{ for } i, j = 1, 2, \ldots, P \tag{13}$$

$$c_j = -\sum_{m=P}^{N-1} x^*_{m-j} x_m \text{ for } j = 1, 2, \ldots, P \tag{14}$$

Proceeding to step 210, matrix a may then be determined by solving equation (15) below utilizing any one of the numerous matrix solution techniques known in the art.

$$Ma = c \tag{15}$$

Returning to step 160, if it is determined that Pisarenko's method of eigenanalysis be utilized in determining the AR coefficients, the method of the present invention proceeds to step 215 where Pisarenko's method of eigenanalysis is utilized to provide an estimate of matrix a. For sinusoids in white noise, the autocorrelation function may be defined as:

$$R_{yy}(0) = \sigma_w^2 + \sum_{i=1}^{P} A_i^2/2 \tag{16}$$

$$R_{yy}(m) = \sum_{i=1}^{P} A_i^2/2 \cos(2\pi k_i m \Delta x), \text{ for } m = 1 \ldots P$$

where noise variance $(\sigma_w^2)$ is an eigenvalue of the autocorrelation matrix $R_{yy}$. For a process consisting of P sinusoids in additive white noise, the noise variance corresponds to the minimum eigenvalue of $R_{yy}$, when the dimension of $R_{yy}$ is $(P+1)$ by $(P+1)$ or greater. Equation (17), below, may be solved for matrix A.

The eigenvector A corresponding to the minimum eigenvalue $\sigma_w^2$ yields the coefficients $a_k$.

$$R_{yy} A = \sigma_w^2 A \tag{17}$$

All of the alternate methods set forth above will satisfactorily produce a matrix a comprising autoregressive model coefficients $a_k$ previously defined as:

$$a = \begin{bmatrix} a_1 \\ a_2 \\ \vdots \\ a_P \end{bmatrix} \tag{6}$$

At this point, the autoregressive matrix a may be utilized to provide complex numbers related to the wavenumbers and decay constants of the desired f-k representation.

More specifically, at step 220, the roots $z_1, \ldots, z_P$ of the polynomial in equation (20) are determined:

$$z^P + a_1 z^{P-1} + a_2 z^{P-2} + \ldots + a_P = 0 \tag{18}$$

where $$z = \exp(j 2\pi K \Delta x) \tag{19}$$

and, proceeding to step 230, equation (20) is solved to yield K(f,i) which is representative of the wavenumbers for the selected frequency and $\Delta(f,i)$ which is representative of the decays for the selected frequency.

$$K(f,i) = [\tan^{-1}(Im(z_i)/Re(z_i))]/2\pi \Delta x \tag{20}$$

$$\lambda(f,i) = [\ln z_i]/\Delta x \tag{21}$$

The resulting hybrid FFT-maximum entropy spectrum Which may be determined by the method described above, does not, however, comprise a complete representation of the f-k representation as no information related to amplitude or phase is provided. The combined FFT and AR coefficient estimation produces primarily estimates of the frequencies in the data and, for each frequency, estimates of the spatial frequencies (wavenumbers) of the complex sinusoids which, if added together, would represent one frequency component of the seismic data. To obtain a complete representation of the data, however, estimates of the amplitudes and phases of these complex sinusoids are desired as well.

The complex sequence for each frequency component in the seismic data may now be produced using Prony's method to define amplitudes and phases for complex non-stationary spatial sinusoids associated with the estimated wavenumbers by estimating wavenumbers, amplitudes, decay rates and phases for complex sinusoids which, when added together, will yield the frequency component.

Proceeding to step 240, the amplitudes are next determined by a least squares solution of the following equation:

$$IB = X \quad (22)$$

where:

$$I = \begin{bmatrix} 1 & 1 & \cdots & 1 \\ z_1 & z_2 & \cdots & z_P \\ \cdot & \cdot & \cdots & \cdot \\ \cdot & \cdot & \cdots & \cdot \\ \cdot & \cdot & \cdots & \cdot \\ z_1^{N-1} & z_2^{N-1} & \cdots & z_P^{N-1} \end{bmatrix} \quad (23)$$

and:

$$X = [X(f,0), \ldots, X(f,N-1)]^T \quad (24)$$

$$B = [b_0, \ldots, b_P]^T \quad (25)$$

for B where:

$$\text{Amplitudes} = A(f,i) = |b_i| \quad (26)$$

Phases may then be determined according to the following equation:

$$\text{phase} = \alpha(f,i) = \tan^{-1}[Im(b_i)/Re(b_i)] \quad (27)$$

Proceeding to step 250, if the last frequency in the frequency range of the FFT transform of the subset of selected traces has been analyzed, the method proceeds to step 270 to commence design of the f-k filter. If it is determined at 250 that there are additional frequencies for analysis, a next frequency is selected at step 260 and the method of the present invention returns to step 150 for further analysis.

Accordingly, for all frequencies f, a collection of wavenumbers k(f,i), decay constants λ(f,i), amplitudes A(f,i) and phases α(f,i) where i=1, 2, ..., P, estimated in accordance with the teachings set forth above constitute a new f-k representation of seismic data for small numbers of traces. The collection of such representations for adjacent or overlapping sets of consecutive seismic traces constitute the data necessary to produce a spatially varying f-k representation of seismic data free from spatial sidelobe or spatial Gibbs processing noise.

Proceeding to step 270, the produced f-k representation is examined to identify the f,k(f,i) pairs which correspond to seismic data and the f,k(f,i) pairs which correspond to coherent noise and, at step 280, a determination is made whether to select signal reconstruction of the x-t data set or noise reconstruction of the x-t data set. If signal reconstruction is selected at step 280, the frequency components of the f-x representation of the coherent noise removed seismic data are reconstructed at step 290 by summing the complex f-k pairs which correspond to seismic data in accordance with Equation (28) below:

$$\hat{X}_{SIGNAL}(f,n) = \quad (28)$$

$$\sum_{\substack{r= \\ \text{signal} \\ \text{components}}} [A(f,r)(\exp\{-\lambda(f,r)n\Delta x\})^* \exp\{j(2\pi k(f,r)n\Delta x + \alpha(f,r))\}]$$

where r is the subset of seismic data wavenumbers.

Proceeding to step 300, the x-t data set of signals is then reconstructed by determining the inverse FFT of the reconstructed frequency components in accordance with Equation (29), which provides:

$$\hat{x}_{SIGNAL}(t,n) = \text{INVERSE } FFT(\hat{X}_{SIGNAL}(f,n)) \quad (29)$$

If it is determined at step 280 to select noise reconstruction of the x-t data set, then the frequency components of the f-x representation of the coherent noise are reconstructed at step 310 by summing the complex f-k pairs which correspond to coherent noise in accordance with Equation (30) below:

$$\hat{X}_{NOISE}(f,n) = \quad (30)$$

$$\sum_{\substack{r= \\ \text{noise} \\ \text{components}}} [A(f,r)(\exp\{-\lambda(f,r)n\Delta x\})^* \exp\{j(2\pi k(f,r)n\Delta x + \alpha(f,r))\}]$$

where r is the subset of coherent noise wavenumbers.

Proceeding to step 320, the x-t data set of coherent noise is then reconstructed by determining the inverse FFT of the reconstructed frequency components according to Equation (31):

$$\hat{x}_{NOISE}(t,n) = \text{INVERSE } FFT(\hat{X}_{NOISE}(f,n)) \quad (31)$$

and, at step 330, the x-t data set of the signals is constructed by subtracting the reconstructed noise from the originally acquired seismic data in accordance with Equation (32):

$$\hat{x}_{SIGNAL}(n,t) = x(n,t) - \hat{x}_{NOISE}(n,t) \quad (32)$$

Proceeding to step 340, the filtered subset is stored and, at step 350, a determination is made whether all subsets of seismic data have been processed according to the methods described above. If all subsets have been processed, the method ends. If it is determined that there are additional subsets of seismic data to be processed, a next subset is selected at step 360 and the method returns to step 130 for further processing of the N consecutive seismic traces comprising the next selected subset.

Thus, there have been described and illustrated herein methods for removing coherent noise from seismic data by computing spatially varying, frequency-wavenumber representations of the data and reconstructing the signal and/or noise components of the seismic data by summing the complex f-k pairs corresponding to signal and/or noise. However, those skilled in the art will recognize that many modifications and variations besides those specifically set forth may be made in the techniques described herein without departing substantially from the concept of the present invention. Accordingly, it should be clearly understood that the form of the invention described herein is exemplary only, and is not intended as a limitation on the scope of the claims.

What is claimed is:

1. A method of seismic exploration comprising the steps of:
    a) positioning at least one seismic source and a plurality of geophones at spaced-apart positions along a line of exploration on the surface of the earth,
    b) activating said seismic sources to generate seismic waves which travel downwardly in the earth and are reflected upward from subsurface reflecting interfaces as seismic reflection signals, c) receiving said seismic signals at said geophones on the surface of the earth, d) recording amplitudes of said seismic signals received by said geophones to produce a first array of seismic traces, said first array of seismic traces being comprised of said seismic signals and coherent noise, e) selecting a plurality of said seismic traces corresponding to said small group of said geophones;

f) producing an f-k representation of seismic signals for said seismic traces;

g) identifying components of said produced f-k representation;

h) reconstructing frequency components of said seismic signals from said seismic signal components of said produced f-k representation;

i) reconstructing said seismic signals from said frequency components;

j) reconstructing frequency components of said coherent noise from said coherent noise components of said produced f-k representation;

k) reconstructing said coherent noise from said frequency components, l) removing said coherent noise by subtracting said reconstructed coherent noise from said series of seismic traces, and m) producing a second array of seismic traces having said coherent noise removed from said seismic traces.

2. The method according to claim 1 wherein the step of identifying components of said produced f-k representation further comprises the step of identifying components of said produced f-k representation which correspond to seismic signals.

3. The method according to claim 1 wherein the step of producing said f-k representation for said series of seismic traces further comprises the steps of:
   transforming said selected plurality of seismic traces into a frequency domain to produce a frequency-amplitude-phase representation;
   determining, for each frequency of said frequency-amplitude-phase representation, complex autoregressive coefficients related to wavenumbers and decay constants of said f-k representation;
   determining, for each frequency of said frequency-amplitude-phase representation, an amplitude and a phase of said f-k representation for each of said wavenumbers determined for said frequency; and
   producing said f-k representation for said series of seismic traces from said wavenumbers, decay constants, amplitudes and phases determined for each frequency.

4. The method according to claim 1 wherein the step of reconstructing frequency components of said seismic signals from said seismic signal components of said produced f-k representation further comprises the step of summing said seismic signal components of said produced f-k representation for each frequency.

5. The method according to claim 4 wherein said seismic data components of said produced f-k representation are summed in accordance with the following:

$$\hat{X}_{SIGNAL}(f,n) =$$

$$\sum_{\substack{r= \\ \text{signal} \\ \text{components}}} [A(f,r)(\exp\{-\lambda(f,r)n\Delta x\})^* \exp\{j(2\pi k(f,r)n\Delta x + \alpha(f,r))\}]$$

where
$\hat{X}_{SIGNAL}(f,n)$ is said summation of said seismic data components of said produced f-k representation;
$A(f,r)$ are said amplitudes of said produced f-k representation;
$\lambda(f,r)$ are said decay constants of said produced f-k representation;
$k(f,r)$ are said wavenumbers of said produced f-k representation; and
$\alpha(f,r)$ are said phases of said produced f-k representation.

6. The method according to claim 1 wherein the step of reconstructing said seismic signals from said frequency components further comprises the step of inverse Fast Fourier transforming said frequency components.

7. The method according to claim 1 wherein the step of identifying said components of said produced f-k representation further comprises the step of identifying components of said produced f-k representation which correspond to coherent noise.

8. The method according to claim 1 wherein the step of reconstructing frequency components of said coherent noise from said coherent noise components of said produced f-k representation further comprises the step of summing said coherent noise components of said produced f-k representation for each frequency.

9. The method according to claim 8 wherein said coherent noise components of said produced f-k representation are summed in accordance with the following:

$$\hat{X}_{SIGNAL}(f,n) =$$

$$\sum_{\substack{r= \\ \text{noise} \\ \text{components}}} [A(f,r)(\exp\{-\lambda(f,r)n\Delta x\})^* \exp\{j(2\pi k(f,r)n\Delta x + \alpha(f,r))\}]$$

where:
$\hat{X}_{NOISE}(f,n)$ is said summation of said coherent noise components of said produced f-k representation;
$A(f,r)$ are said amplitudes of said produced f-k representation;
$\lambda(f,r)$ are said decay constants of said produced f-k representation;
$k(f,r)$ are said wavenumbers of said produced f-k representation; and
$\alpha(f,r)$ are said phases of said produced f-k representation.

10. The method according to claim 1 wherein the step of reconstructing said coherent noise from said frequency components further comprises the steps of:
   inverse Fast Fourier transforming said frequency components; and
   subtracting said inverse Fast Fourier Transform of said frequency components from said series of seismic traces.

11. A method of seismic exploration comprising the steps of:

a) positioning at least one seismic source and a plurality of geophones at spaced-apart positions along a line of exploration on the surface of the earth,
b) activating said seismic sources to generate seismic waves which travel downwardly in the earth and are reflected upward from subsurface reflecting interfaces as seismic reflection signals,
c) receiving said seismic signals at said geophones on the surface of the earth,
d) recording amplitudes of said seismic signals received by said geophones to produce a first array of seismic traces, said first array of seismic traces being comprised of said seismic signals and coherent noise,
e) producing an f-k representation from said acquired seismic traces;
f) identifying components of said produced f-k representation;
g) reconstructing said seismic traces without coherent noise from said identified components of said produced f-k representation;
h) subtracting said reconstructed coherent noise from said acquired seismic traces, and
i) producing a second array of seismic traces having said coherent noise removed from said seismic traces.

12. The method according to claim 11 wherein the step of identifying components of said produced f-k representation further comprises the step of identifying components of said produced f-k representation which correspond to seismic signals.

13. The method according to claim 12 wherein the step of identifying components of said f-k representation further comprises the steps of:
transforming said seismic traces into the frequency domain to produce a frequency-amplitude-phase representation; and
producing a high resolution spectrum for said frequency-amplitude-phase representation.

14. The method according to claim 13 wherein said produced high resolution spectrum is a maximum entropy spectrum.

15. The method according to claim 12 wherein the step of producing said f-k representation further comprises the steps of:
transforming said seismic traces into the frequency domain to produce a frequency-amplitude-phase representation for a series of frequencies;
determining a series of AR coefficients from said frequency-amplitude-phase representation;
estimating a series of roots of a polynomial from said series of AR coefficients;
applying Prony's method to said roots to produce a series of phases and amplitudes; and
producing said f-k representation.

16. The method according to claim 15 wherein said series of roots are representative of wavenumbers and decay constants of said f-k representation.

17. The method according to claim 11 wherein the step of reconstructing said seismic traces from said identified components of said produced f-k representation further comprises the steps of:
reconstructing frequency components of said seismic signals from said seismic signal components of said produced f-k representation; and
reconstructing said seismic signals from said frequency components.

18. The method according to claim 17 wherein the step of reconstructing frequency components of said seismic signals from said seismic signal components of said produced f-k representation further comprises the step of summing said seismic signal components of said produced f-k representation for each frequency.

19. The method according to claim 18 wherein said seismic signal components of said produced f-k representation are summed in accordance with the following:

$$\hat{X}_{SIGNAL}(f,n) =$$

$$\sum_{\substack{r= \\ \text{signal} \\ \text{components}}} [A(f,r)(\exp\{-\lambda(f,r)n\Delta x\})^* \exp\{j(2\pi k(f,r)n\Delta x + \alpha(f,r))\}]$$

where:
$\hat{X}_{SIGNAL}(f,n)$ is said summation of said seismic signal components of said produced f-k representation;
$A(f,r)$ are said amplitudes of said produced f-k representation;
$\lambda(f,r)$ are said decay constants of said produced f-k representation;
$k(f,r)$ are said wavenumbers of said produced f-k representation; and
$\alpha(f,r)$ are said phases of said produced f-k representation.

20. The method according to claim 18 wherein the step of reconstructing said seismic signals from said frequency components further comprises the step of inverse Fast Fourier transforming said frequency components.

21. The method according to claim 11 wherein the step of identifying components of said produced f-k representation further comprises the step of identifying components of said produced f-k representation which correspond to coherent noise.

22. The method according to claim 11 wherein the step of producing said f-k representation further comprises the steps of:
transforming said seismic traces into the frequency domain to produce a frequency-amplitude-phase representation for a series of frequencies;
determining a series of AR coefficients from said frequency-amplitude-phase representation;
estimating a series of roots of a polynomial from said series of AR coefficients;
applying Prony's method to said roots to produce a series of phases and amplitudes; and
producing said f-k representation.

23. The method according to claim 22 wherein said series of roots are representative of wavenumbers and decay constants of said f-k representation.

24. The method according to claim 11 wherein the step of reconstructing said coherent noise from said identified components of said produced f-k representation further comprises the steps of:
reconstructing frequency components of said coherent noise from said coherent noise components of said produced f-k representation; and
reconstructing said coherent noise from said frequency components.

25. The method according to claim 24 wherein the step of reconstructing frequency components of said coherent noise from said coherent noise components of said produced f-k representation further comprises the step of summing said coherent noise components of said produced f-k representation.

26. The method according to claim 25 wherein said coherent noise components of said produced f-k representation are summed in accordance with the following:

$$\hat{X}_{NOISE}(f,n) = \sum_{\substack{r= \\ \text{noise} \\ \text{components}}} [A(f,r)(\exp\{-\lambda(f,r)n\Delta x\})^* \exp\{j(2\pi k(f,r)n\Delta x + \alpha(f,r))\}]$$

where:
$\hat{X}_{NOISE}(f,n)$ is said summation of said coherent noise components of said produced f-k representation;

$A(f,r)$ are said amplitudes of said produced f-k representation;

$\lambda(f,r)$ are said decay constants of said produced f-k representation;

$k(f,r)$ are said wavenumbers of said produced f-k representation; and $\alpha(f,r)$ are said phases of said produced f-k representation.

27. The method according to claim 26 wherein the step of reconstructing said coherent noise from said frequency components further comprises the steps of:
inverse Fast Fourier transforming said frequency components; and
subtracting said inverse Fast Fourier Transform of said frequency components from said series of seismic traces.

28. A method of seismic exploration comprising the steps of:
a) positioning at least one seismic source and a plurality of geophones at spaced-apart positions along a line of exploration on the surface of the earth,
b) activating said seismic sources to generate seismic waves which travel downwardly in the earth and are reflected upward from substrate reflecting interfaces as seismic reflection signals,
c) receiving said seismic signals at said geophones on the surface of the earth,
d) recording amplitudes of said seismic signals received by said geophones to produce a first array of seismic traces, said first array of seismic traces being comprised of said seismic signals and coherent noise,
e) transforming said seismic traces into the frequency domain to produce a frequency-amplitude-phase representation;
f) determining, for each frequency of said frequency-amplitude-phase representation, complex AR coefficients related to wavenumbers and decay constants;
g) determining, for each frequency of said frequency-amplitude-phase representation, an amplitude and a phase for each of said determined wavenumbers;
h) producing an f-k representation from said wavenumbers, decau constants, amplitudes and phases determined for each frequency;
i) identifying components of said produced f-k representation;
j) reconstructing said seismic traces without coherent noise from said identified components of said produced f-k representation;
k) subtracting said coherent noise from said seismic traces, and
l) producing a second array of seismic traces having said coherent noise removed from said seismic traces.

29. The method according to claim 28 wherein the step of identifying components of said produced f-k representation further comprises the step of identifying components of said produced f-k representation which correspond to seismic signals.

30. The method according to claim 29 wherein the step of reconstructing said seismic traces from said identified components of said produced f-k representation further comprises the steps of:
reconstructing frequency components of said seismic signals from said seismic signal components of said produced f-k representation; and
reconstructing said seismic signals from said frequency components.

31. The method according to claim 30 wherein the step of reconstructing frequency components of said seismic signals from said seismic signal components of said produced f-k representation further comprises the step of summing said seismic signal components of said produced f-k representation.

32. The method according to claim 31 wherein said seismic signal components of said produced f-k representation are summed in accordance with the following:

$$\hat{X}_{SIGNAL}(f,n) = \sum_{\substack{r= \\ \text{signal} \\ \text{components}}} [A(f,r)(\exp\{-\lambda(f,r)n\Delta x\})^* \exp\{j(2\pi k(f,r)n\Delta x + \alpha(f,r))\}]$$

where:
$\hat{X}_{SIGNAL}(f,n)$ is said summation of said seismic data components of said produced f-k representation;

$A(f,r)$ are said amplitudes of said produced f-k representation;

$\lambda(f,r)$ are said decay constants of said produced f-k representation;

$k(f,r)$ are said wavenumbers of said produced f-k representation; and $\alpha(f,r)$ are said phases of said produced f-k representation.

33. The method according to claim 28 wherein the step of identifying components of said produced f-k representation further comprises the step of identifying components of said produced f-k representation which correspond to coherent noise.

34. The method according to claim 28 wherein the step of reconstructing said coherent noise from said identified components of said produced f-k representation further comprises the steps of:
reconstructing frequency components of said coherent noise from said coherent noise components of said produced f-k representation; and
reconstructing said coherent noise from said frequency components.

35. The method according to claim 34 wherein the step of reconstructing frequency components of said coherent noise from said coherent noise components of said produced f-k representation further comprises the step of summing said coherent noise components of said produced f-k representation.

36. The method according to claim 35 wherein said coherent noise components of said produced f-k representation are summed in accordance with the following:

$$\hat{X}_{NOISE}(f,n) = \sum_{\substack{r= \\ \text{noise} \\ \text{components}}} [A(f,r)(\exp\{-\lambda(f,r)n\Delta x\}) \cdot \exp\{j(2\pi k(f,r)n\Delta x + \alpha(f,r))\}]$$

where:

$\hat{X}_{NOISE}(f,n)$ is said summation of said coherent noise components of said produced f-k representation;

$A(f,r)$ are said amplitudes of said produced f-k representation;

$\lambda(f,r)$ are said decay constants of said produced f-k representation;

$k(f,r)$ are said wavenumbers of said produced f-k representation; and $\alpha(f,r)$ are said phases of said produced f-k representation.

37. The method according to claim 34 wherein the step of reconstructing said coherent noise from said frequency components further comprises the steps of:

inverse Fast Fourier transforming said frequency components; and subtracting said inverse Fast Fourier transform of said frequency components from said series of seismic traces.

* * * * *